(12) United States Patent
Singer et al.

(10) Patent No.: US 11,554,972 B2
(45) Date of Patent: Jan. 17, 2023

(54) TREATING WATER USING A NON-UNIFORM MAGNETIC FIELD

(71) Applicant: H2oElite LLC, Largo, FL (US)

(72) Inventors: Jeffrey Singer, Largo, FL (US); Adel Elzind, Largo, FL (US)

(73) Assignee: H2oElite LLC, Largo, FL (US)

( * ) Notice: Subject to any disclaimer, the term of this patent is extended or adjusted under 35 U.S.C. 154(b) by 30 days.

(21) Appl. No.: 16/436,610

(22) Filed: Jun. 10, 2019

(65) Prior Publication Data
US 2020/0385294 A1 Dec. 10, 2020

(51) Int. Cl.
*C02F 1/48* (2006.01)

(52) U.S. Cl.
CPC ........ *C02F 1/487* (2013.01); *C02F 2201/483* (2013.01)

(58) Field of Classification Search
CPC ...... C02F 1/487; C02F 2201/483; C02F 1/48; C02F 1/481; C02F 1/482; C02F 1/484; C02F 1/485; C02F 2201/48; B01D 35/06; B01D 2259/814; B01D 2311/2607; B01D 2311/2615; B03C 1/0335
See application file for complete search history.

(56) References Cited

U.S. PATENT DOCUMENTS

| | | | | |
|---|---|---|---|---|
| 5,074,998 A * | 12/1991 | De Baat Doelman | .... | C02F 1/48 210/97 |
| 5,171,431 A * | 12/1992 | Schulte | ...... | C02F 1/48 210/94 |
| 5,738,766 A * | 4/1998 | Jefferson | ........ | C02F 1/487 204/155 |
| 2003/0226794 A1 * | 12/2003 | Coke | ........ | C02F 1/48 210/222 |
| 2007/0029261 A1 * | 2/2007 | Chew | ........ | C02F 1/48 210/243 |
| 2007/0051685 A1 * | 3/2007 | Wittmer | ........ | H03K 3/57 210/695 |

(Continued)

FOREIGN PATENT DOCUMENTS

| | | | |
|---|---|---|---|
| DE | 8913491 | * | 3/1990 |
| DE | 4433784 A1 | | 7/1995 |

(Continued)

OTHER PUBLICATIONS

English language machine translation of DE4433784A1, 6 pages, No Date.*
English language machine translation of EP1741677, 12 pages, No Date.*
Banejad et al. "The Effect of Magnetic Field on Water Hardness Reducing," Thirteenth International Water Technology Conference, Mar. 12-15, 2009, Hurghada, Egypt; 117-128.

(Continued)

*Primary Examiner* — Pranav N Patel
(74) *Attorney, Agent, or Firm* — Morrison & Foerster LLP

(57) ABSTRACT

Provided are water treatment systems and methods of treating water. A water treatment system comprises a first wire coil wrapped around a water pipe at a first angle, wherein the first angle is less than 90°, as measured from a direction of water flow through the water pipe; a second wire coil wrapped around the water pipe at a second angle, wherein the second angle is more than 90°, as measured from the direction of water flow through the water pipe; and a controller configured to send a first electric current to the first wire coil to generate a first magnetic field and a second electric current to the second wire coil to generate a second magnetic field.

22 Claims, 6 Drawing Sheets

(56) References Cited

U.S. PATENT DOCUMENTS

| | | | |
|---|---|---|---|
| 2008/0295861 A1* | 12/2008 | Mai | B08B 7/00 |
| | | | 134/1 |
| 2013/0192682 A1* | 8/2013 | Freese | E21B 37/00 |
| | | | 137/13 |
| 2016/0016829 A1* | 1/2016 | Hughes | C02F 1/487 |
| | | | 204/661 |
| 2016/0260533 A1* | 9/2016 | Wilson | H01F 5/00 |
| 2018/0178184 A1* | 6/2018 | Holland | B03C 1/288 |
| 2018/0327288 A1* | 11/2018 | Yamauchi | C02F 1/4691 |

FOREIGN PATENT DOCUMENTS

| | | | |
|---|---|---|---|
| EP | 1741677 | * | 1/2007 |
| FR | 2697537 | * | 5/1994 |
| FR | 2703675 | * | 10/1994 |
| NL | WO0047522 | * | 8/2000 |
| WO | 2008/017321 A1 | | 2/2008 |

OTHER PUBLICATIONS

Gholizadeh et al. (2005). "The Effect of Magnetic Field on Scale Prevention in the Industrial Boilers," International Journal of Applied Chemistry 1(1): 84-89.

Liu et al. (Oct. 2014). "Electromagnetic Field Acting on the Scale Inhibition Experiment and Mechanism on Circulating Cooling Water of Power Plant," Applied Mechanics and Materials 664: 62-69.

Runov et al. (2015). "Efficiency Improvement of Heat Exchangers by the Rational Choice of the Range of Frequencies of Electromagnetic Water Treatment," Thermal Engineering 62(5): 374-377.

International Search Report and Written Opinion dated Sep. 21, 2020, directed to International Application No. PCT/US2020/035560; 13 pages.

* cited by examiner

TREATING WATER USING A NON-UNIFORM MAGNETIC FIELD

FIELD OF THE INVENTION

This disclosure relates to water treatment systems, and more particularly, to water treatment systems that use a non-uniform magnetic field to control ion concentration in a water supply.

BACKGROUND OF THE INVENTION

Dissolved salts in water, such as calcium carbonate, magnesium carbonate, magnesium sulfate, sodium chloride, and cations such as ferrous iron can come from a variety of origins. For example, rivers, lakes, and mineral springs all pickup elements and compounds from the earth that are soluble in water under certain environmental conditions. Manmade causes such as agricultural runoff, urban runoff, and wastewater runoff can also introduce salts, metal ions, and basic oxides into bodies of water.

However, a high amount of dissolved solids is undesirable for various reasons. For example, high amounts of calcium carbonate and/or magnesium sulfate can increase hardness of water and cause mineral buildup in pipes. Additionally, high amounts of dissolved solids in potable water can affect the taste, making it less desirable to drink.

Accordingly, different technologies are used for treating water to manage dissolved salts. For example, technologies such as reverse osmosis, ion-exchange, and chemicals may be used to remove and/or manage dissolved salts in water. In particular, reverse osmosis uses a semipermeable membrane and applied pressure (to overcome the osmotic pressure of the water) to remove dissolved solids. Ion-exchange is the exchange of ions (i.e., dissolved solids) between two electrolytes. Chemicals that may be used to remove dissolved solids from water can include coagulants, flocculants, chlorination and de-chlorination agents, or biocides.

SUMMARY OF THE INVENTION

Provided are water treatment systems and methods for treating particular types of water with said water treatment systems. In particular, water treatment systems and methods of treating water provided herein utilize a non-uniform magnetic field to treat water in a water pipe. By using two or more wire coils wrapped at opposing angles to each other around a water pipe, a non-uniform magnetic field can be generated. The non-uniform magnetic field can be directed downwards to focus the dissolved ions into a zone of increased ion concentration. The magnetic field of one wire coil may be stronger than that of the second wire coil, such that the stronger magnetic field forces the dissolved ions towards the wire coil of weaker magnetic force. As the ions concentrate in an area between the two wire coils, they may combine, precipitate out of solution, and separate from the main water flow.

As described above, the two magnetic fields may be generated in a way such that the stronger magnetic field forces ions towards the weaker magnetic field. In some embodiments, the direction of this force may be against the flow direction of the water. The dissolved ions may be held back and delayed by the magnetic field from the main stream of water regardless of their polarity. As water flows through the pipe, the concentration of dissolved ions increases in this zone between the two magnetic fields. In this region of high ion concentration, the ions can recombine to form chemical compounds and precipitate out of solution. Once precipitated, the ions/chemical compounds can be separated from the water stream flowing through the water pipe to reduce water hardness and scale. In some embodiments, as the flow rate of water increases, some of the precipitated particles may redissolve in the water. Accordingly, each of the two magnetic fields can be controlled individually to balance the rate of precipitation with the rate of dissolution to improve water quality.

For example, when a low frequency non-uniform magnetic field is applied to water flowing through a pipe in a direction that is parallel to a direction of the water flow, it can lower the surface tension, increasing both viscosity and cluster size, which can allow the water to dissolve more salts. A cluster is hydrogen bonded assembly of water molecules. The size of the cluster varies according to the angle between the two hydrogen atoms in reference to the oxygen atom in a molecule of water. The cluster size can also be impacted by the hydrogen bond strength.

Additionally, alternating low frequency (e.g., 400-450 Hz) non-uniform magnetic fields can physically change the structure of the precipitated particles. For example, alternating a low frequency non-uniform magnetic field can reduce the amount of calcite to increase the amount of aragonite precipitated out of solution. Calcite and aragonite are both polymorphs of calcium carbonate. However, calcite can cause buildup in water pipes and is very difficult to remove. Conversely, even though aragonite is intrinsically harder, it resists forming hard scale on surfaces and is more soluble than calcite. In some embodiments, soluble ferrous iron in the presence of the non-uniform magnetic field can reduce calcite and stabilize aragonite.

In some embodiments, alternating higher frequency (e.g., 10,000-15,000 Hz) non-uniform magnetic fields can create a mechanical force. Generating a mechanical force can help remove existing scale in water pipes. As hard water particles (i.e., scale buildup) are removed from water pipes, the water flow improves. This increase in water flow can help removing other scale buildup in the water pipes and can help prevent new scale buildup from forming.

Water treatment systems provided herein can include at least two electric magnets, wherein each of the two electric magnets comprises a wire coil wrapped around the water pipe. In some embodiments, each of the at least two electric magnets can be configured to have a controlled current running through its wire coil. One of the wire coils may be wrapped at an angle less than 90°, and the second wire coil may be wrapped at an angle of greater than 90°, with respect to an axis running parallel with a direction of water flow through the water pipe. A controller may also be included to supply an electric current to the wire coils independently, which can generate a magnetic field running with each of the two wire coils. For example, a controller may be configured to change the magnetic field intensity and/or the direction of each coil independently to create a non-uniform magnetic field between the two coils. In some embodiments, the opposing angles (i.e., one angle less than 90°, and one angle greater than 90°, with respect to an axis running parallel with a direction of water flow through the pipe) of the two wire coils wrapped around the pipe may be configured to deflect the magnetic field downward. By deflecting the magnetic field between the two wire coils downward, ions in the water can be trapped and delayed from moving with the main water flow. As described above, this non-uniform magnetic field forces ions to recombine, precipitate, and separate from the main water flow.

Methods for treating water may include wrapping wire coils around a water pipe and/or passing water to be treated through a pipe having two wire coils wrapped around it. The wire coils may be wrapped at opposing angles (i.e., one angle less than 90°, and one angle greater than 90°, with respect to an axis running parallel with a direction of water flow through the pipe). A magnetic field may be generated by each of the two wire coils. Each wire coil may be energized separately and differently by a controller to produce a non-uniform magnetic field in the pipe between the two coils.

In some embodiments, a water treatment method is provided, the method comprising: wrapping a first wire coil around a water pipe at a first angle, wherein the first angle is less than 90°, as measured from a direction of water flow through the water pipe; wrapping a second wire coil around the water pipe at a second angle, wherein the second angle is more than 90°, as measured from the direction of water flow through the water pipe; and controlling a first electric current that generates a magnetic field at the first wire coil and a second electric current that generates a magnetic field at the second wire coil.

In some embodiments of the method, controlling a first electric current that generates a magnetic field at the first wire coil and a second electric current that generates a magnetic field at the second wire coil comprises: measuring water flow rate through the water pipe; and adjusting the first electric current and the second electric current based on the measured flow rate of water.

In some embodiments of the method, controlling a first electric current that generates a magnetic field at the first wire coil and a second electric current that generates a magnetic field at the second wire coil comprises: measuring total dissolved solids in water flowing through the water pipe; and adjusting the first electric current and the second electric current based on the measured total dissolved solids.

In some embodiments of the method, controlling a first electric current that generates a magnetic field at the first wire coil and a second electric current that generates a magnetic field at the second wire coil comprises: collecting cations from the water flowing through the water pipe with an energized cathode of an electrode.

In some embodiments of the method, the first electric current and the second electric current are the same.

In some embodiments of the method, the first electric current and the second electric current are different.

In some embodiments of the method, the water pipe comprises a diameter of 0.25-48 inches.

In some embodiments of the method, the water flows through the water pipe at a flow rate of 2-1000 gallons per minute (gpm).

In some embodiments of the method, the water pipe comprises polyvinyl chloride, cross-linked polyethylene, copper, or ferrous-based piping material.

In some embodiments of the method, a wire of the first wire coil and the second wire coil comprises a gauge of 8-18 American wire gauge (AWG).

In some embodiments of the method, controlling a first electric current that generates a magnetic field at the first wire coil and a second electric current that generates a magnetic field at the second wire coil comprises outputting an electric current of 2-10 amps.

In some embodiments, a water treatment kit is provided, the kit comprising: wire for wrapping a first wire coil and a second wire coil around a water pipe; one or more wire holders configured to hold a first portion of the wire at a first angle to form a first wire coil, wherein the first angle is less than 90°, as measured from a direction of water flow through the water pipe, and hold a second portion of the wire at a second angle to form a second wire coil, wherein the second angle is more than 90°, as measured from a direction of water flow through the water pipe; and a controller configured to send a first electric current to the first wire coil around the water pipe to generate a first magnetic field and a second electric current to the second wire coil around the water pipe to generate a second magnetic field.

In some embodiments of the kit, the kit comprises a water flow sensor configured to measure a flow rate of water flowing through the water pipe and configured to communicate the flow rate to the controller.

In some embodiments of the kit, the kit comprises a total dissolved solids sensor configured to measure the total dissolved solids of water flowing through the water pipe and configured to communicate the total dissolved solids to the controller.

In some embodiments of the kit, the controller is configured to adjust the first electric current and the second electric current based on the flow rate.

In some embodiments of the kit, the controller is configured to adjust the first electric current and the second electric current based on the total dissolved solids.

In some embodiments of the kit, the first electric current and the second electric current are the same.

In some embodiments of the kit, the first electric current and the second electric current are different.

In some embodiments of the kit, the water pipe comprises a diameter of 0.25-48 inches.

In some embodiments of the kit, the water pipe comprises polyvinyl chloride, cross-linked polyethylene, copper, or ferrous-based piping material.

In some embodiments of the kit, a wire of the first wire coil and the second wire coil comprises a gauge of 8-18 AWG.

In some embodiments of the kit, the controller is configured to output a current of 2-10 amps.

In some embodiments, a water treatment system is provided, the system comprising: a first wire coil wrapped around a water pipe at a first angle, wherein the first angle is less than 90°, as measured from a direction of water flow through the water pipe; a second wire coil wrapped around the water pipe at a second angle, wherein the second angle is more than 90°, as measured from the direction of water flow through the water pipe; and a controller configured to send a first electric current to the first wire coil to generate a first magnetic field and a second electric current to the second wire coil to generate a second magnetic field.

In some embodiments of the system, the system comprises a water flow sensor configured to measure a flow rate of the water flowing through the water pipe and configured to communicate the flow rate to the controller.

In some embodiments of the system, the system comprises a total dissolved solids sensor configured to measure the total dissolved solids of water flowing through the water pipe and configured to communicate the total dissolved solids to the controller.

In some embodiments of the system, the system comprises an electrode pair configured to collect cations from the water flowing through the water pipe to be transported to a reservoir.

In some embodiments of the system, the controller is configured to adjust the first electric current and the second electric current based on the water flow rate.

In some embodiments of the system, the controller is configured to adjust the first electric current and the second electric current based on the total dissolved solids.

In some embodiments of the system, the first electric current and the second electric current are the same.

In some embodiments of the system, the first electric current and the second electric current are different.

In some embodiments of the system, the water pipe comprises a diameter of 0.25-48 inches.

In some embodiments of the system, the water flows through the water pipe at a flow rate of 2-1000 gpm.

In some embodiments of the system, the water pipe comprises polyvinyl chloride, cross-linked polyethylene, copper, or ferrous-based piping material.

In some embodiments of the system, a wire of the first wire coil and the second wire coil comprises a gauge of 8-18 AWG.

In some embodiments of the system, the controller is configured to output a current of 2-10 amps.

In some embodiments, a method of treating water is provided, the method comprising: running water to be treated through a water pipe, the water pipe comprising a first wire coil wrapped around the water pipe at a first angle and a second wire coil wrapped around the water pipe at a second angle, wherein the first angle less than 90°, as measured from a direction of water flow through the water pipe and the second angle is more than 90°, as measured from the direction of water flow through the water pipe; and controlling a first electric current that generates a magnetic field at the first wire coil and a second electric current that generates a magnetic field at the second wire coil.

In some embodiments of the method, controlling a first electric current that generates a magnetic field at the first wire coil and a second electric current that generates a magnetic field at the second wire coil comprises: measuring a flow rate of water flowing through the water pipe; and adjusting the first electric current and the second electric current based on the measured flow rate.

In some embodiments of the method, controlling a first electric current that generates a magnetic field at the first wire coil and a second electric current that generates a magnetic field at the second wire coil comprises: measuring total dissolved solids in water flowing through the water pipe; and adjusting the first electric current and the second electric current based on the measured total dissolved solids.

In some embodiments of the method, controlling a first electric current that generates a magnetic field at the first wire coil and a second electric current that generates a magnetic field at the second wire coil comprises: collecting cations from the water flowing through the water pipe with an energized cathode of an electrode.

In some embodiments of the method, the first electric current and the second electric current are the same.

In some embodiments of the method, the first electric current and the second electric current are different.

In some embodiments of the method, the water pipe comprises a diameter of 0.25-48 inches.

In some embodiments of the method, the water flows through the water pipe at a flow rate of 2-1000 gpm.

In some embodiments of the method, the water pipe comprises polyvinyl chloride, cross-linked polyethylene, copper, or ferrous-based piping material.

In some embodiments of the method, a wire of the first wire coil and the second wire coil comprises a gauge of 8-18 AWG.

In some embodiments of the method, controlling a first electric current that generates a magnetic field at the first wire coil and a second electric current that generates a magnetic field at the second wire coil comprises outputting an electric current of 2-10 amps.

BRIEF DESCRIPTION OF THE DRAWINGS

The invention will now be described, by way of example only, with reference to the accompanying drawings, in which.

DETAILED DESCRIPTION OF THE INVENTION

Figure 1:
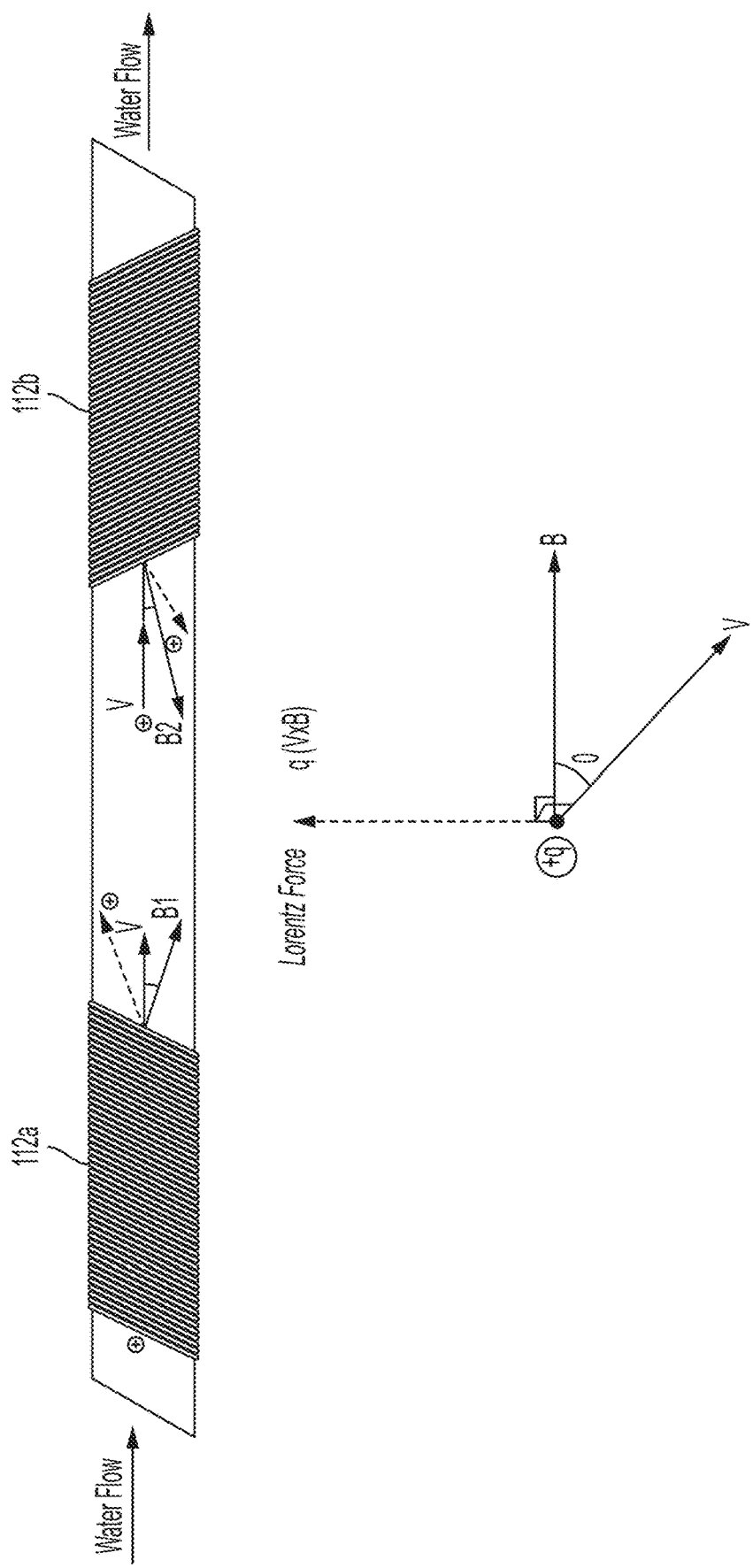
FIG. 1 is a diagram illustrating the drift of a charged particle due to a deflected magnetic fields, according to some embodiments.

Described herein are water treatment systems and methods for treating water with said water treatment systems. As described above, water treatment systems and method of treating water provided herein can utilize a non-uniform magnetic field to treat water by deflecting the non-uniform magnetic field downward. By deflecting downward, the non-uniform magnetic field creates a zone that can trap dissolved ions, cause them to recombine to form one or more different chemical compounds, precipitate out of solution, and separate from the water flow. As water flows through the water pipe, the concentration of ions increases within the specified zone and, based on their polarity, the ions combine to form compounds that precipitate and separate from the main stream of water. For example, water treatment systems and methods of treating water according to embodiments provided herein can use a non-uniform magnetic field to reduce water hardness by precipitating calcium carbonate and magnesium phosphate, reducing their ion concentration in the water.

Additionally, water treatment systems and methods of treating water provided herein can also use a non-uniform magnetic field to change the physical structure of precipitating calcium carbonate. Calcite and aragonite are two different polymorphs of calcium carbonate. Calcite frequently forms scale buildup in water pipes which can be painstaking to remove. Aragonite, on the other hand, while an intrinsically harder material, is more soluble in water than calcite and thus less likely to form hard scale on pipes and other surfaces in contact with water. Accordingly, using a non-uniform magnetic field according to methods provided herein can increase the amount of aragonite and decrease the amount of calcite.

Additionally, water treatment systems and methods of treating water provided herein can use a non-uniform magnetic field to mechanically remove and/or prevent scale buildup. For example, the non-uniform magnetic field can be pulsed at a high frequency (e.g., 10,000-15,000 pulses per second) to break down scale buildup over time and allow it to pass through the pipes. As the scale breaks down, the water flow increases. This increased water flow can help remove other scale buildup in the water pipes and help prevent new scale buildup within the water pipes.

In some embodiments, water treatment systems provided herein include two wire coils wrapped around a pipe. The two wire coils may be wrapped at opposing angles (i.e., one angle less than 90°, and one angle greater than 90°, with respect to an axis running parallel with a direction of water flow through the pipe), deflecting the non-uniform magnetic field downward. In some embodiments, one of the wire coils may be wrapped at an angle of 35°, to 75°, and the second wire coil may be wrapped at an angle of 105°, to 145°, with respect to a direction of fluid flow through the pipe. These two wire coils wrapped at opposing angles can deflect a non-uniform magnetic field downward to an area located between the two wire coils.

A controller may also be included to supply an electric current to each of the two wire coils. In some embodiments, the controller may be configured to supply an electric current to each of the two wire coils independently. The controller can control the intensity and/or the direction of the magnetic field generated by each wire coil. For example, the controller can supply current at variable pulse width and rate to each coil. The current supplied to each of the two or more coils independently can be the same or different. In some embodiments, the current and/or frequency at which each wire coil is pulsed can depend on the measured values of the flow rate TDS and/or water flow rate communicated by said controller. By wrapping the two wire coils around the pipe at opposing angles, the magnetic field is deflected downward, creating a Lorentz force that drifts ions away from the direction of the water flow and towards the wire coil of weaker magnetic field. Controlling the magnetic field to manipulate the drift of ions can delay the ions in the zone of non-uniform magnetic field between the two wire coils.

The discussion below includes: (1) a background of the electromagnetic principles involved in water treatment systems of the present disclosure; (2) a description of water treatment systems according to the present disclosure; (3) methods of purifying water using water treatment systems of the present disclosure; and (4) examples of water treatment systems of the present disclosure.

MOTION OF A CHARGED PARTICLE IN A MAGNETIC FIELD

Discussed below are electromagnetic principles that are involved in water treatment systems disclosed herein. Specifically, double ionic layers and the Lorenz force are each discussed below.

Exposing water to a low frequency magnetic field can affect gas nanobubbles in the water by disrupting the double ionic layer on the gas nanobubbles. A double ionic layer is a structure that appears on the surface of an object (e.g., a gas bubble) when it is exposed to a fluid. The first layer of the double ionic layer is the surface charge and includes ions adsorbed onto the object due to chemical interactions. The second layer of the double ionic layer, the diffuse layer, comprises ions attracted to the surface charge. These ions of the diffuse layer are free ions that move in the fluid under the influence of electric attraction and thermal motion. A low frequency magnetic field exposure can compromise the gas/liquid interface of the water and disturb the ionic double layer that contributes to bubble stabilization in the water.

The Lorenz force is a combination of electric and magnetic forces on a point charge due to electromagnetic fields. Specifically, a particle of charge q moving with a flow rate v in an electric field E and a magnetic field B experiences a force of:

$$F=qE+qv \times B$$

Since the magnetic Lorentz force is always perpendicular to the magnetic field, it has no influence on the parallel motion of ions moving parallel to the magnetic field lines under two wire coils of a water treatment system provided herein. However, a charged particle will experience a force in the direction away from the larger magnetic field towards the weaker magnetic field.

FIG. 1 shows an example of a positive charged particle in a parallel magnetic field B while under wire coil 112a. Wire coil 112b is producing a stronger magnetic field than wire coil 112a (shown by the magnitude of the magnetic field vectors). Due to the wrap angles of wire coils 118a and 118b, the magnetic field is deflected downward between wire coils 118a and 118b as shown to generate a Lorentz effect force on the charged particle. This Lorenz effect force causes the charged particle to drift to the side of the water pipe and back towards the wire coil of weaker magnetic field (i.e., wire coil 112a), causing it to be delayed and halted in a region where ion concentration increases, preventing the charged particle from staying with the flow of the main stream of water. This increase in ion concentration between wire coils 118a and 118b also forces precipitation of particles from the main stream of water.

WATER TREATMENT SYSTEMS

Discussed below are water treatment systems according to embodiments provided herein. In particular, water treatment systems disclosed include at least two wire coils wrapped at opposing angles around a water pipe. These two wire coils can generate a non-uniform magnetic field. As described in detail above, water treatment systems provided herein can use a non-uniform magnetic field to treat the water flowing through a pipe by physically altering the structure of precipitated compounds and by producing a mechanical force that can remove existing scale buildup.

Figure 2:
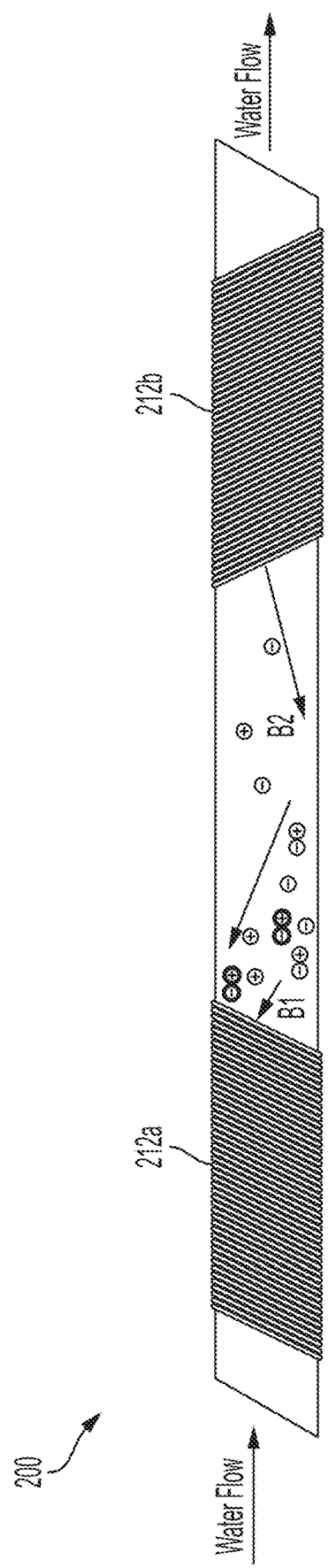
FIG. 2 shows precipitated particles in a non-uniform magnetic field, according to some embodiments.

FIG. 2 shows water treatment system 200 comprising wire coil 212a and wire coil 212b wrapped around water pipe 210. The angles of the wrapping of wire coils 212a and 212b with respect to the direction of water flow through water pipe 210 deflect the non-uniform magnetic field downward. Thus, the deflected non-uniform magnetic field creates a zone of increased ion concentration between wire coils 212a and 212b. B1 represents the magnetic field of wire coil 212a and B2 represents the magnetic field of wire coil 212b. As shown, B1 (i.e., the magnetic field of wire coil 212a) is weaker than B2 (i.e., the magnetic field of wire coil 212b). Thus, the ions of the water flowing through water pipe 210 are directed towards wire coil 212a, which in this case, is the wire coil of weaker magnetic field. As the ions are directed towards wire coil 212a, the ion concentration in this zone increases. Due to the increase in ion concentration, some of the ions will combine to form chemical compounds (e.g., calcium carbonate) and will precipitate out of solution. Accordingly, water treatment systems provided herein, such as water treatment system 200 of FIG. 2 use a non-uniform magnetic field to treat water flowing through a pipe by controlling the amount of dissolved ions/salts in the water.

Figure 3:
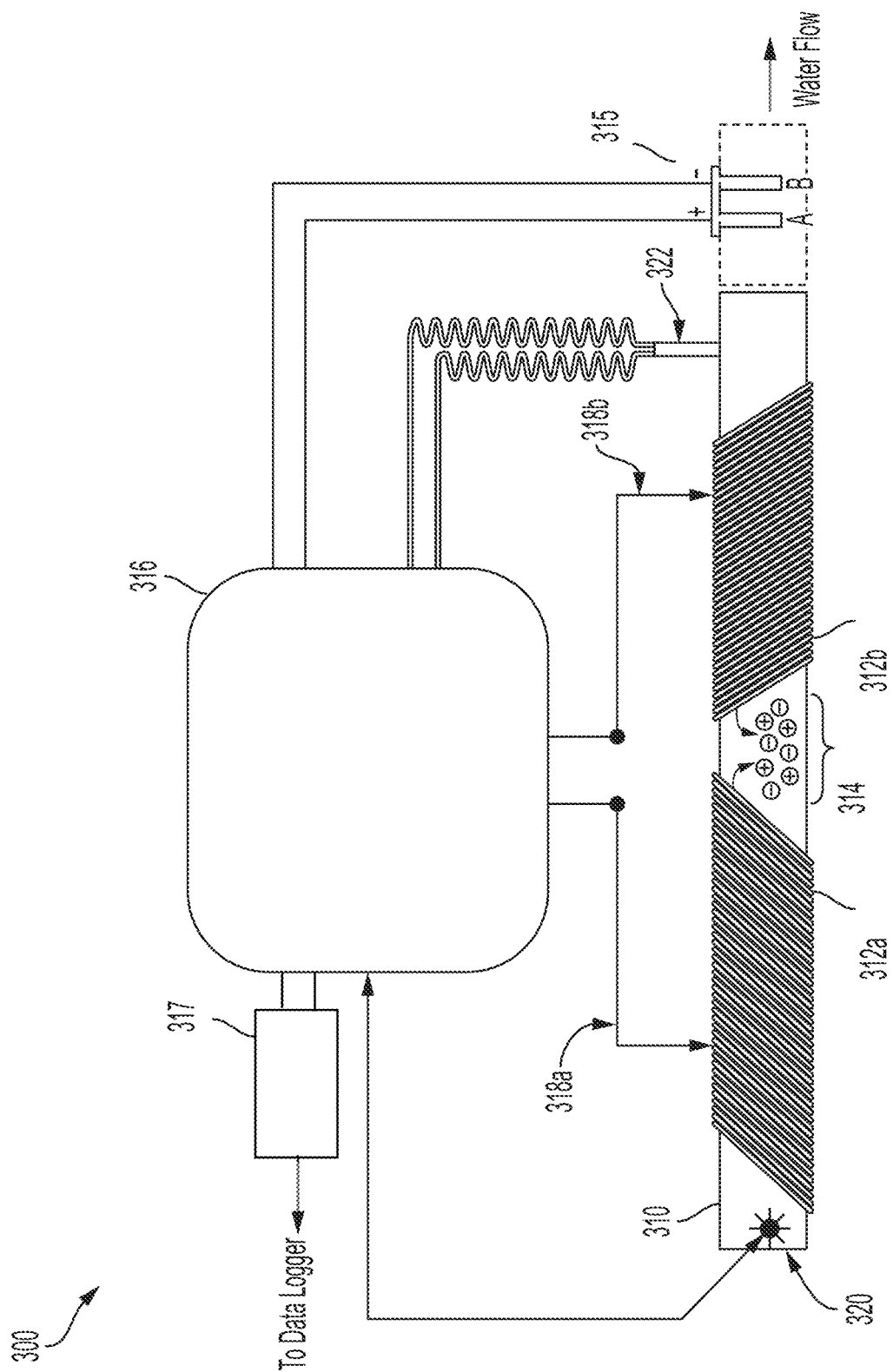
FIG. 3 shows a water treatment system comprising electronic control operating on two coils wrapped around water pipe and monitoring water flow rate and TDS, according to some embodiments.

FIG. 3 provides an example of water treatment system 300 according to some embodiments. Water treatment system 300 can include water pipe 310, a first wire coil 312a, a second wire coil 312b, a plurality of charged ions 314, a controller 316, a first magnet control 318a, a second magnet control 318b, a water flow sensor 320, a total dissolved solids (TDS) sensor, a pair of electrodes 315, and a communication module 317. In particular, FIG. 3 provides an example of directing ions to a zone of high ionic concentration created by deflecting a non-uniform magnetic field between wire coil 312a and wire coil 312b, forcing the ions to combine to form chemical compounds that precipitate out of solution.

Water treatment system 300 may treat water flowing at various flow rates through water pipe 310. For example, water treatment system 300 may treat water flowing at 2-2500 gallons per minute (gpm). In some embodiments, water treatment system 300 may treat water flowing at less than 2500 gpm, less than 2000 gpm, less than 1500 gpm, less than 1000 gpm, less than 800 gpm, less than 600 gpm, less than 400 gpm, less than 200 gpm, less than 100 gpm, less than 50 gpm, or less than 25 gpm. In some embodiments, water treatment system 300 may treat water flowing at more than 2 gpm, more than 25 gpm, more than 50 gpm, more than 100 gpm, more than 200 gpm, more than 400 gpm, more than 600 gpm, more than 800 gpm, more than 1000 gpm, more than 1500 gpm, or more than 2000 gpm.

Additionally, water pipe 310 may be of various diameters, materials, etc. For example, water treatment system 300 may be designed to treat water of various types and for various industries. As a water treatment system is designed for a particular type of water and/or a particular industry, water pipe 310 may be of various diameters. For example, a water treatment system designed for residential applications may be up to 1.5 inches in diameter. A water treatment system designed for commercial and/or industrial applications may be 1.5 inches in diameter, 3 inches in diameter, 5 inches in diameter, 8 inches in diameter, or even 20 inches in diameter or more. As the diameter of the pipe increases, the power supply providing the magnetic field may increase. Conversely, as the diameter of the pipe decreases, the power supply required may also decrease. In some embodiments, the diameter of the water pipe may be from 0.25 inches to 48 inches, from 1 to 4 inches, from 2 to 10 inches, or from 20 to 30 inches. In some embodiments, the diameter of the water pipe may be less than 48 inches, less than 36 inches, less than 32 inches, less than 30 inches, less than 28 inches, less than 24 inches, less than 20 inches, less than 18 inches, less than 16 inches, less than 12 inches, less than 10 inches, less than 8 inches, less than 5 inches, less than 4 inches, less than 3 inches, less than 2 inches, or less than 1 inch. In some embodiments, the diameter of the water pipe may be greater than 0.25 inches, greater than 0.5 inches, greater than 1 inch, greater than 2 inches, greater than 3 inches, greater than 4 inches, greater than 5 inches, greater than 8 inches, greater than 10 inches, greater than 12 inches, greater than 16 inches, greater than 18 inches, greater than 20 inches, greater than 24 inches, greater than 28 inches, greater than 30 inches, or greater than 32 inches.

Water pipe 310 may comprise various materials. For example, water pipe 310 may include polyvinyl chloride, chlorinated polyvinyl chloride, cross-linked polyethylene, copper, and ferrous-based piping materials. In some embodiments, water treatment systems according to embodiments provided herein may be applied to existing piping. Thus, installing a water treatment system provided herein may not require specialized piping or cutting the pipe to install the water treatment system. Described in detail below are methods of installing water treatment systems onto existing piping.

Conventional water treatment systems employing a magnetic field typically wrap wire coils at a 90°, angle to the direction of water flow through the pipe (i.e., perpendicular to the direction of water flow through the pipe) to create a uniform magnetic field. However, water treatment systems according to embodiments provided herein wrap the wire coils at angles greater than 90°, and less than 90°, with respect to a direction of water flow through the pipe. In some embodiments, wrapping the wire coils at an angle greater than and/or less than 90°, with respect to the direction of water flow through the pipe can form a deflected magnetic field in the non-uniform magnetic field area between the two or more wire coils as described herein.

As shown in the figure, wire coil 312a and wire coil 312b are wrapped around water pipe 310. In some embodiments, a first magnet runs with the wrap of wire coil 312a, and a second magnet runs with the wrap of wire coil 312b. In some embodiments, the number of wraps of each coil around water pipe 310 is calculated to produce a specific inductance value. This specific inductance value can correspond to the diameter and material of the water pipe 310. The wire coils may not overlap on the water pipe. In some embodiments, wire coil 312a or wire coil 312b may be wrapped at an angle of less than 90°. For example, wire coil 312a may be wrapped around water pipe 310 at an angle of 35°, to 75°, 40°, to 70°, or 45°, to 65°. In some embodiments, wire coil 312a or wire coil 312b may be wrapped at an angle of less than 75°, less than 70°, less than 65°, less than 60°, less than 55°, less than 50°, less than 45°, or less than 40°. In some embodiments, wire coil 312a or wire coil 312b may be wrapped at an angle of more than 35°, more than 40°, more than 45°, more than 50°, more than 55°, more than 60°, more than 65°, or more than 70°.

In some embodiments, a wire coil may be wrapped at an angle of greater than 90°, with respect to an axis running along the direction of water flow through the pipe. For example, wire coil 312a or wire coil 312b may be wrapped around water pipe 310 at an angle of 105°, to 145°, 110°, to 140°, 115°, to 135°, or 120°, to 130°. In some embodiments, wire coil 312a or wire coil 312b may be wrapped around water pipe 310 at an angle of less than 145°, less than 140°, less than 135°, less than 130°, less than 125°, less than 120°, less than 115°, or less than 110°. In some embodiments, wire coil 312a or wire coil 312b may be wrapped around water pipe 310 at an angle of more than 105°, more than 110°, more than 115°, more than 120°, more than 125°, more than 130°, more than 135°, or more than 140°.

In some embodiments, the number of times the wire is wrapped around water pipe 310 may vary. In some embodiments, the number of wire wraps around water pipe 310 may depend upon the material of water pipe 310. For example, water pipe 310 made of copper may have twice the number of wire wrapped around it as compared to a polyvinyl chloride pipe to produce the same specific inductance based on the same size diameter of the water pipe 310.

In some embodiments, wire coil 312a and wire coil 312b may run at the same magnetic frequency or at different magnetic frequencies. Whether wire coils 312a and 312b run at the same or at different frequencies may depend upon the type of water running through water pipe 310. For example, in some agricultural or poultry applications, wire coil 312a may run at a higher frequency to treat the water by minimizing and/or eliminating scale build-up in the pipe. Wire coil 312b may run at a lower frequency than wire coil 312a to convert the calcium carbonate to aragonite (i.e., water-soluble calcium) that can be beneficial to agriculture (e.g., chickens, turkeys, pigs, cows, tomatoes, other growing plants). In other circumstances (e.g., hard water or a water waste treatment facility), wire coil 312a and wire coil 312b may run at the same magnetic frequency.

As described above, wire coils 312a and 312b may be wrapped at opposing angles (i.e., one wire coil wrapped at an angle less than 90°, and one wire coil wrapped at an angle greater than 90°, with respect to a direction of water flow through water pipe 310). For example, when wire coil 312a is wrapped around water pipe 310 at an angle less than 90°, and wire coil 312b is wrapped at an angle greater than 90°, with respect to a direction of water flow through water pipe 310, charged ions 314 that are located in between the two wire coils may be forced down away from an edge of the pipe due to the non-uniform magnetic field generated between wire coil 312a and wire coil 312b. Conventional water treatment systems that include perpendicularly-wrapped wire coils (i.e., wire coils wrapped at 90°, with respect to a direction of water flow through the pipe) generate a magnetic field that is not sufficient to force the charged ions down from the edge of the pipe.

The wire gauge of wire coils 312a and 312b may vary according to the size of water pipe 310. For example, as the diameter of water pipe 310 increases, the gauge of the wire can decrease. In some embodiments, the gauge of the wire may be from 4 to 30, from 8 to 24, from 8 to 18, or from 12 to 18 American wire gauge (AWG). In some embodiments, the gauge of the wire of the wire coils may be less than 30, less than 28, less than 26, less than 24, less than 22, less than 20, less than 18, less than 16, less than 14, less than 12, less than 10, less than 8, or less than 6 AWG. In some embodiments, the gauge of the wire may be more than 4, more than 6, more than 8, more than 10, more than 12, more than 14, more than 16, more than 18, more than 20, more than 22, more than 24, more than 26, or more than 28 AWG.

Controller 316 may be used to generate the magnetic field of water treatment system 300. In particular, controller 316 can send one or more independent current-modulated signals to each of wire coil 312a and wire coil 312b via magnet control 318a and magnet control 318b, respectively. In some embodiments, controller 316 may receive information from water flow sensor 320 and/or TDS sensor 322. In some embodiments, controller 316 may adjust the one or more electric current it sends to wire coil 312a and wire coil 312b according to the information received from water flow sensor 320 and/or TDS sensor 322.

In some embodiments, the type of controller 316 used to control water treatment system 300 may depend upon the type of water pipe 310. For example, controller 316 may increase in power as the diameter of water pipe 310 increases. In some embodiments, controller 316 may comprise an input voltage of 90-264 volts AC power at 47 to 63 Hertz. In some embodiments, controller 316 may include an input current of 10-50 watts or 20-30 watts. In some embodiments, controller 316 may include an input current of less than 50 watts, less than 40 watts, less than 30 watts, or less than 20 watts. In some embodiments, controller 316 may include an input current of more than 10 watts, more than 20 watts, more than 30 watts, or more than 40 watts. In some embodiments, controller 316 may be configured to send an electric current to wire coil 312a and wire coil 312b alternately.

In some embodiments, controller 316 may include a human machine interface (HMI) that can allow a user to interact with water treatment system. For example, the HMI of controller 316 may display for a user indicators that can include the power that the system is running at, whether the system is running at all, whether the system is in calibration mode, etc.

In some embodiments, controller 316 may include a circuit board. In some embodiments, controller 316 may include a computer. In some embodiments, controller 316 may include one or more processors and one or more memory.

In some embodiments, one or more controller 316 from one or more water treatment system 300 may be interconnected and may communicate to a communication module at a central location. For example, a user may be able to use a computer including, but not limited to, a desktop computer, a laptop computer, or a handheld computer (e.g., a tablet or a mobile phone), to monitor and control one or more water treatment systems 300. In some embodiments, the communication module may utilize wireless technologies to communicate data from the one or more water treatment systems 300 to the central location. For example, wireless technologies that may be used include cellular, Bluetooth, Wi-Fi, etc. In some embodiments, the communication module may utilize wired technologies to communicate data from the one or more water treatment systems 300 to the central location.

In some embodiments, if two or more water treatment systems 300 are operating together and one malfunctions, a user may be able to use a communication module to identify which of the two or more water treatment systems are malfunctioning. For example, each of the two or more water treatment systems 300 and controllers 316 may be individually controlled and communicated with such that a user can monitor the individual status of each system and controller.

In some embodiments, a communication module 317 shown in FIG. 3 may be integrated to controller 316. Communication module 317 may be capable of transmitting water variables such as TDS, conductivity, and flow rate to a data logger or a computer.

Water flow sensor 320 can measure the flow of the water passing through water pipe 310 and communicate the water flow information to controller 316. Based on the water flow data sent to controller 316 by water flow sensor 320 and/or TDS sensor 322, controller 316 can determine what strength of electric current to send to wire coil 312a and wire coil 312b (via magnet control 318a and magnet control 318b, respectively), to balance between the rate of precipitation and the rate that precipitated particles that will dissolve again in the flow of water. Thus, the flow of the water is indirectly controlling the electric current that is sent to wire coil 312a and wire coil 312b and the magnetic frequencies generated by the signal(s). For example, water flow sensor 320 can signal controller 316 if the water in water pipe 310 is stagnant, water flow sensor 320 communicates this information to controller 316, and controller 316 responds by sending one or more electric current via magnet control 318a and magnet control 318b to wire coil 312a and wire coil 312b, respectively, corresponding to the stagnant water flow. In some embodiments, controller 316 can go into a standby mode or power-saving mode (e.g., by disabling wire coil 312a and/or 318b) when water flow sensor 320 senses and communicates that the water in water pipe 310 is stagnant. If the water is steadily flowing through water pipe 310, water flow sensor 320 can send this information to controller 316, and controller 316 can send one or more signals via magnet control 318a and magnet control 318b to wire coil 312a and wire coil 312b, respectively, corresponding to this steady water flow. For example, when water flow sensor 320 detects water movement in water pipe 310, it can signal controller 316 to setup wire coils 312a and 312b in a way such that the generated magnetic field of coil 312b is higher in magnitude and opposite in direction than the magnetic field generated by coil 312a. The strength of the magnetic field can be calculated by controller 316 based on the data received from the flow sensor 320 and/or the TDS sensor 322.

In some embodiments, water flow sensor 320 may be located before wire coil 312a and wire coil 312b, such that water flow sensor 320 measures the flow of the water in water pipe 310 before it reaches wire coils 312a and 312b. In some embodiments, water flow sensor 320 may be located after wire coil 312a and 312b, such that water flow sensor 320 measure the flow of the water in water pipe 310 after it passes through wire coils 312a and 312b.

TDS sensor 322 can measure the total dissolved solids in the water. In some embodiments, TDS sensor 322 can measure all dissolved solids in the water. In some embodiments, TDS sensor 322 may measure a particular type of dissolved solid only (e.g., calcium). Like water flow sensor 320, TDS sensor 322 sends data about the water flowing through water pipe 310 to controller 316. Based on the information about the total dissolved solids sent to controller 316 by TDS sensor 322, controller 316 can adjust one or more electric current that it send0s through magnet control 318a and magnet control 318b to wire coil 312a and wire coil 312b, respectively. Thus, as with water flow sensor 320 described above, the one or more electric current sent by controller 316 can react to and reflect characteristics of the water passing through water pipe 310 (in this case, the total dissolved solids in the water).

In some embodiments, TDS sensor 322 may be located after wire coil 312a and wire coil 312b, such that TDS sensor measures total dissolved solids in the water passing through water pipe 310 after it passes wire coils 312a and 312b. In some embodiments, TDS 322 sensor may be located prior to wire coil 312a and wire coil 312b, such that TDS sensor 322 measures total dissolved solids in the water flowing through water pipe 310 before it reaches wire coils 312a and 312b. In some embodiments, a first TDS sensor 322 may be located before wire coils 312a and 312b and a second TDS sensor 322 may be located after wire coils 312a and 312b such that the total dissolved solids may be measured both before and after the water passes through wire coils 312a and 312b. Both the first TDS sensor 322 and the second TDS sensor 322 may communicate TDS information with controller 316, and controller 316 may adjust one or more electric current it sends to wire coil 312a and/or wire coil 312b accordingly.

In some embodiments, a water treatment system according to embodiments provided herein may include a water recirculation loop. For example, at least a portion of water that flows through the section of water pipe 310 comprising wire coil 312a and wire coil 312b may recirculate through the section of water pipe comprising wire coil 312a and wire coil 312b at least a second time such that the water is treated at least two times, wherein a single treatment corresponds to a single pass through the section of water pipe 310 comprising wire coil 312a and 312b. In some embodiments, water may be treated 2, 3, 4, or 5 times. In some embodiments, a water treatment system may include a valve controller that is configured to close when recirculating the water and configured to open when allowing the water to exit the water treatment system after being treated. In some embodiments, the operation of the valve controller may depend upon a measure of TDS. If the TDS in the water is too high based upon the information sent from TDS sensor 322 to controller 316, controller 316 may be configured to send an electric current to the valve controller telling the valve controller to close and force the water back through the treatment region of water pipe 310 (i.e., the portion of water pipe 310 comprising wire coil 312a and wire coil 312b).

In some embodiments, water treatment system 300 may include a pair of electrodes 315. Electrode pair 315 can include a positive electrode and a negative electrode. Electrode pair 315 may be energized by controller 316 and may be used in circulating water systems in large institutions where positive ions in water (cations) can be collected by the cathode and pumped out to a reservoir where it is allowed to nucleate, separated from water by gravity while water is circulating.

Controller 316 may control the electrodes, which may be made of non-corrosive materials such as graphite or stainless steel. The electrodes can effectively control water hardness and add an extra level to control ion concentration in water. In addition to non-corrosive materials, other materials and shapes may be used for particular reasons. For example, ionizers using copper, silver, or an alloy of both copper and silver may be used to control the growth of algae, viruses, and bacteria in swimming pools and other industrial application. Such ionizers may be energized by controller 316 periodically to produce a level of copper ions in water.

METHODS OF TREATING WATER

Provided below is a discussion of methods of wrapping a wire coil around a water pipe at an angle and methods of treating water using water treatment systems provided herein.

Methods of Wrapping a Wire Coil

As described in detail above, the wire coils of water treatment systems herein are wrapped at angles greater than 90°, or less than 90°, with respect to a direction of water flow through the water pipe. In contrast, conventional water treatment systems using magnetic fields may include wire coils wrapped perpendicularly, or at 90°, to a direction of water flow through the water pipe. Thus, methods of treating water provided herein may include methods of wrapping a wire coil described below.

Methods of wrapping a wire coil according to embodiments provided herein can include using a specific holder to hold the wire when wrapping the wire around the water pipe. In some embodiments, a method of wrapping a wire coil may include wrapping a wire around a water pipe at an angle less than 90°, with respect to the direction of water flow through the water pipe to form a first wire coil. The method may include wrapping a second wire coil around the water pipe at an angle of greater than 90°, with respect to the direction of water flow through the water pipe to form a second wire coil.

In some embodiments, the holder may include a suitable jig, clamp, or stabilizer to help the wrapped wire stay in place taught around the water pipe and not bag or sag. In some embodiments, the holder can be placed around the pipe and held in place with zip ties. One holder can work on several different pipe sizes.

Figure 4A:
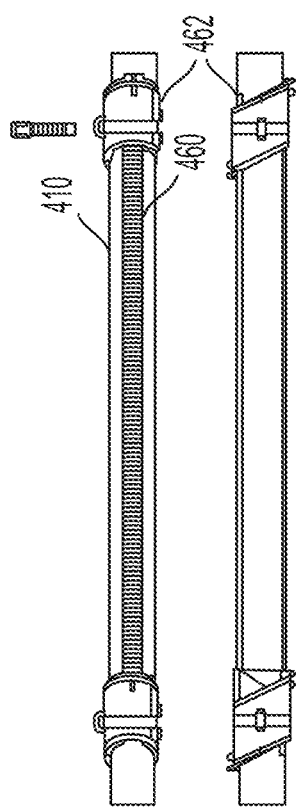
FIGS. 4a-4c show holders for wrapping a wire coil around a pipe, according to some embodiments.
Figure 4C:
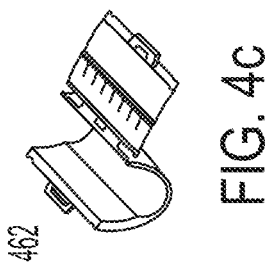
Figure 4B:
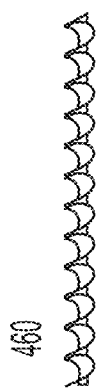

For example, FIG. 4a shows an example of a holder positioned on pipe 410 that may be used to wrap the wire at a specified angle according to some embodiments. In particular, a holder can include wire channel 460 and end piece 462. As shown in FIG. 4b, which provides a close-up view of wire channel 460, the wire of the wire coils can be laid in the wire grooves of wire channel 460 to hold the wire coil in place at a specified angel relative to the direction of water flow through the pipe 410. FIG. 4c shows a close-up view of an end piece 462 that is in an open configuration. End piece 462 may be clamped around pipe 410 to form a closed configuration as shown in FIG. 4a to hold wire channel 460 in place. In some embodiments, a method for wrapping a wire coil may include one wire channel 462. In some embodiments, a method for wrapping a wire coil may include two or more wire channels 462. In some embodiments, a method for wrapping a wire coil may include one end piece 462. In some embodiments, a method may include two end pieces 462. In some embodiments, an end piece 462 and/or a wire channel 460 may be unique to a specific wrapping angle. In some embodiments, an end piece 462 and/or a wire channel 460 may be suitable for various wrap angles. In some embodiments, end piece 462 may be held in place using zip ties.

Methods of Treating Water

Provided herein are methods of treating water using a non-uniform magnetic field. Methods of treating water according to embodiments provided herein may include a method of wrapping a wire coil described immediately above.

In some embodiments, methods of treating water may include passing water through a water pipe comprising two wire coils. As described above, a first wire coil may be wrapped at an angle of less than 90°, and a second wire coil may be wrapped at an angle of more than 90°, with respect to a direction of water flowing through the water pipe. A non-uniform magnetic field may be generated between the wrapped wire coils.

In some embodiments, methods of treating water may include installing a controller that is configured to send one or more electric current each of the two wire coils. In some embodiments, the controller may be configured to receive water flow information sent from a water flow sensor. In some embodiments, the controller may be configured to adjust the one or more electric signal sent to the two wire coils according to the water flow information. In some embodiments, the controller may be configured to receive total dissolved solids information from a total dissolved solids sensor. In some embodiments, the controller may be configured to adjust the one or more electric currents sent to the wire coils based on the total dissolved solids information.

EXAMPLES

Figure 5:
FIG. 5 shows precipitated calcium carbonate particles from a magnetically treated water sample (top) and a non-magnetically treated water sample (bottom)

FIG. 5 shows two samples of calcium carbonate scale. The top sample contains water treated by a water treatment system according to embodiments provided herein. The bottom sample shows calcium carbonate scale of untreated water obtained from the same water source as the top sample. As shown, the top sample (i.e., water treated according to embodiments provided herein) comprises less accumulation of calcium carbonate scale than the untreated bottom sample.

Figure 6:
FIG. 6 shows precipitated calcium carbonate particles and iron deposits from a magnetically treated water sample (top) and a non-magnetically treated water sample (bottom).

FIG. 6 shows two samples of iron deposits. The top sample includes water treated by a water treatment system according to embodiments provided herein. The bottom sample includes iron deposits of untreated water obtained from the same water source as top sample. As shown, the top sample (i.e., water treated according to embodiments provided herein) comprises fewer accumulation of iron deposits than the untreated bottom sample.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X".

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes", "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims.

The invention claimed is:

1. A water treatment kit comprising:
   wire for wrapping a first wire coil and a second wire coil around a water pipe;
   one or more wire holders, each of the one or more wire holders comprising a wire channel and an end piece, wherein the one or more wire holders are configured to hold a first portion of the wire at a first angle to form a first wire coil, wherein the first angle is less than 90° as measured from a direction of water flow through the water pipe, and hold a second portion of the wire at a second angle to form a second wire coil, wherein the second angle is more than 90° as measured from a direction of water flow through the water pipe; and
   a controller configured to independently control an electric current sent to each of the first wire coil and the second wire coil based on water data received from one or more of a water flow sensor or a total dissolved solids sensor, wherein the controller is configured to send a first electric current to the first wire coil around the water pipe to generate a first magnetic or electric field and a second electric current to the second wire coil around the water pipe to generate a second magnetic or electric field, wherein the first electric current and the second electric current are different in magnitude and pulsed at a frequency between 10 and 15 kHz to generate a mechanical force in the water treatment system, and wherein the controller is configured to enter a power-saving mode when the water flow sensor detects and communicates to the controller that water in the water pipe is stagnant.

2. The kit of claim 1, wherein the water flow sensor is configured to measure a flow rate of water flowing through the water pipe and configured to communicate the flow rate to the controller.

3. The kit of claim 1, wherein the total dissolved solids sensor is configured to measure the total dissolved solids of water flowing through the water pipe and configured to communicate the total dissolved solids to the controller.

4. The kit of claim 2, wherein the water data received by the controller comprises the flow rate measured by the water flow sensor, and wherein the controller is configured to adjust the first electric current and the second electric current based on the flow rate.

5. The kit of claim 3, wherein the water data received by the controller comprises the total dissolved solids measured by the total dissolved solids sensor, and wherein the controller is configured to adjust the first electric current and the second electric current based on the total dissolved solids.

6. The kit of claim 1, wherein the water pipe comprises a diameter of 0.25-48 inches.

7. The kit of claim 1, wherein the water pipe comprises polyvinyl chloride, cross-linked polyethylene, copper, or ferrous-based piping material.

8. The kit of claim 1, wherein a wire of the first wire coil and the second wire coil comprises a gauge of 8-18 AWG.

9. The kit of claim 1, wherein the controller is configured to output a current of 2-10 amps.

10. The kit of claim 1, wherein the first electric current and the second electric current are independent in both polarity and magnitude.

11. A water treatment system comprising:
a first wire coil wrapped around a water pipe at a first angle, wherein the first angle is less than 90° as measured from a direction of water flow through the water pipe;
a second wire coil wrapped around the water pipe at a second angle, wherein the second angle is more than 90° as measured from the direction of water flow through the water pipe; and
a controller configured to independently control an electric current sent to each of the first wire coil and the second wire coil based on water data received from one or more of a water flow sensor or a total dissolved solids sensor, wherein the controller is configured to send a first electric current to the first wire coil to generate a first magnetic or electric field and a second electric current to the second wire coil to generate a second magnetic or electric field, wherein the first electric current and the second electric current are different in magnitude and pulsed at a frequency between 10 and 15 kHz to generate a mechanical force in the water treatment system, and wherein the controller is configured to enter a power-saving mode when the water flow sensor detects and communicates to the controller that water in the water pipe is stagnant.

12. The system of claim 11, wherein the water flow sensor is configured to measure a flow rate of the water flowing through the water pipe and configured to communicate the flow rate to the controller.

13. The system of claim 11, wherein the total dissolved solids sensor is configured to measure the total dissolved solids of water flowing through the water pipe and configured to communicate the total dissolved solids to the controller.

14. The system of claim 11, comprising an electrode pair configured to collect cations from the water flowing through the water pipe to be transported to a reservoir.

15. The system of claim 12, wherein the controller is configured to adjust the first electric current and the second electric current based on the water flow rate.

16. The system of claim 13, wherein the controller is configured to adjust the first electric current and the second electric current based on the total dissolved solids.

17. The system of claim 11, wherein the water pipe comprises a diameter of 0.25-48 inches.

18. The system of claim 11, wherein the water flows through the water pipe at a flow rate of 2-1000 gpm.

19. The system of claim 11, wherein the water pipe comprises polyvinyl chloride, cross-linked polyethylene, copper, or ferrous-based piping material.

20. The system of claim 11, wherein a wire of the first wire coil and the second wire coil comprises a gauge of 8-18 AWG.

21. The system of claim 11, wherein the controller is configured to output a current of 2-10 amps.

22. The system of claim 11, wherein the first electric current and the second electric current are independent in both polarity and magnitude.

* * * * *